United States Patent [19]

Williams et al.

[11] 4,440,433
[45] Apr. 3, 1984

[54] AIR DEFLECTOR AND METHOD OF PROVIDING AIR DEFLECTOR

[76] Inventors: Wallace W. Williams, 42 E. Terrace St.; Eddie Williams, 3033 N. Glen St., both of Altadena, Calif. 91001

[21] Appl. No.: 365,746

[22] Filed: Apr. 5, 1982

[51] Int. Cl.³ .............................................. B62D 35/00
[52] U.S. Cl. ......................................... 296/15; 296/91
[58] Field of Search ............................. 296/15, 91, 43

[56] References Cited

U.S. PATENT DOCUMENTS

| | | | |
|---|---|---|---|
| 2,396,506 | 3/1946 | Harris | 180/5 CL |
| 2,863,695 | 12/1958 | Stamm | 296/1 S |
| 3,348,873 | 10/1967 | Saunders | 296/1 S |
| 3,873,914 | 4/1975 | Gulich et al. | 296/1 S |
| 4,156,543 | 5/1979 | Taylor et al. | 296/1 S |
| 4,199,185 | 4/1980 | Woolcock | 296/1 S |

*Primary Examiner*—Robert R. Song
*Attorney, Agent, or Firm*—Nilsson, Robbins, Dalgarn, Berliner, Carson & Wurst

[57] ABSTRACT

An air deflector is adapted to be mounted on a vehicle and, by deflecting air, to reduce turbulence and drag associated with another vehicle which is towed by the first vehicle. The air deflector includes a side shield to extend outwardly and rearwardly outside a side wall of the front vehicle along the side wall, and a mounting for the shield, to mount the shield on the front vehicle. The side shield has an inner edge surface which defines an edge surface contour for facing the side wall of the vehicle in close proximity to such side wall. The mounting is adapted to accomplish the facing-close proximity relationship between the inner edge surface of the shield and the side wall of the vehicle. The mounting includes a post to insert in a substantially vertical opening provided on the front vehicle, and a brace. The post has a surface to extend outwardly and rearwardly and to abut the rear surface of the shield. The brace has a shield flange to extend outwardly and rearwardly and to also abut the rear surface of the shield, and a vehicle flange to extend along and to abut the side wall of the front vehicle. The shield and mounting are adapted to provide the close proximity between the inner edge surface and the side wall of the front vehicle while maintaining such inner edge surface and side wall in spaced-apart relation. The air deflector is particularly adapted for use on a pick-up truck. Method aspects, i.e., a method of providing an air deflector, are in accordance with the described air deflector and its use.

12 Claims, 6 Drawing Figures

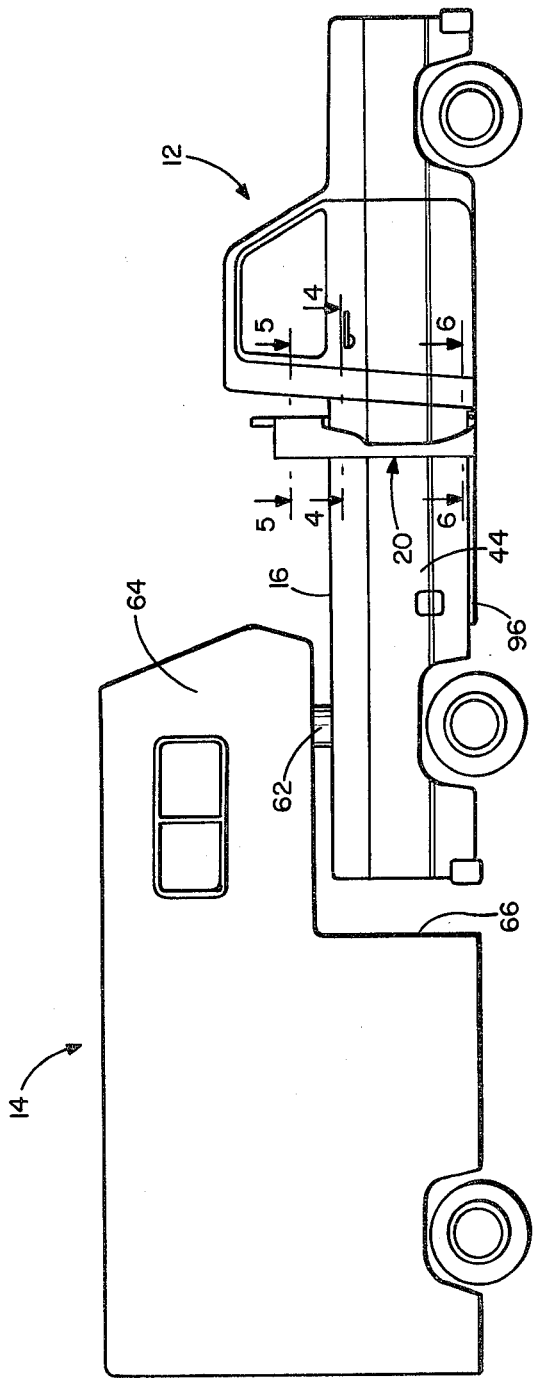
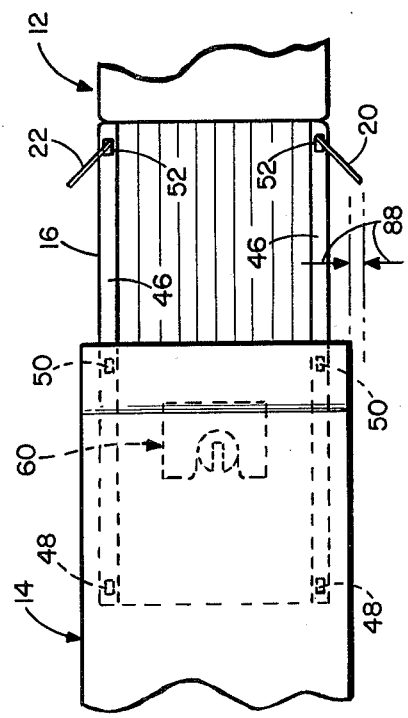

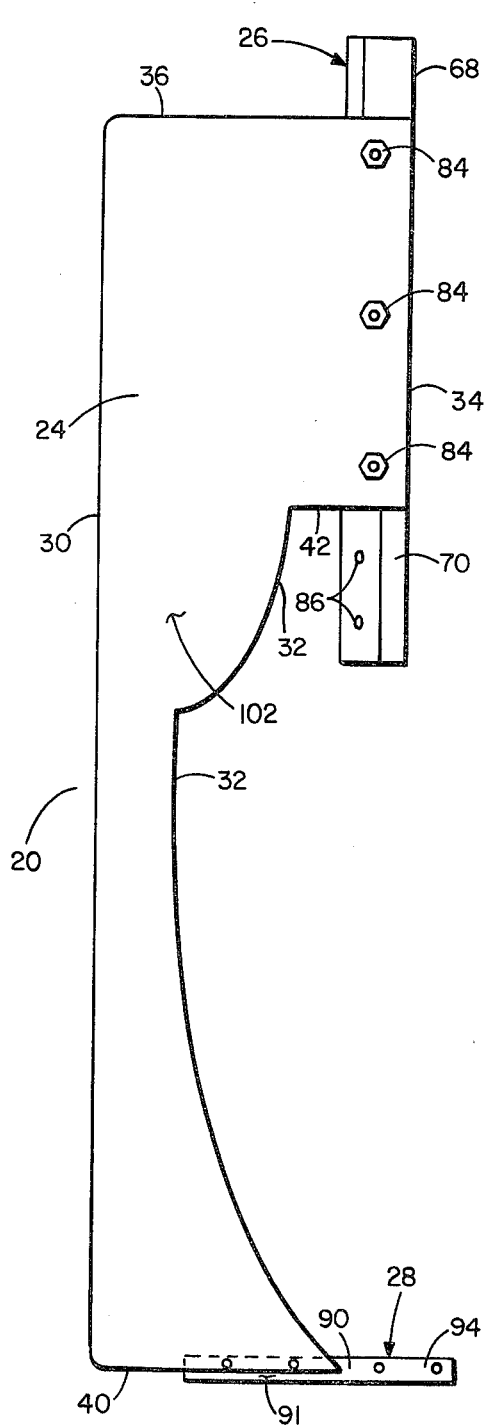
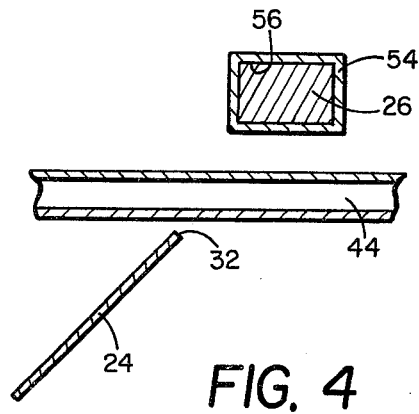
FIG. 4
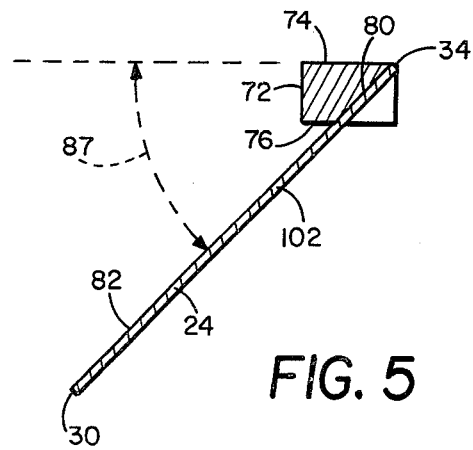
FIG. 5
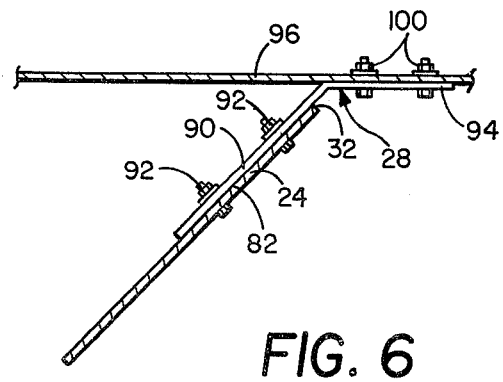
FIG. 3
FIG. 6

AIR DEFLECTOR AND METHOD OF PROVIDING AIR DEFLECTOR

FIELD OF THE INVENTION

The field of the invention pertains to devices and methods for reducing turbulence and drag associated with a vehicle which is towed by another vehicle.

BACKGROUND OF THE INVENTION

The reduction of air turbulence and of drag associated with a vehicle which is towed by another vehicle, is a concern which is widely recognized. By way of example, the use of structures on a front vehicle to reduce turbulence and/or drag associated with a taller rear vehicle is a rather common occurrence on the roadways. Some examples of rather unconventional structures of this kind can be found in, for example, Saunders, U.S. Pat. No. 3,348,873, Stamm, U.S. Pat. No. 2,863,695, Woolcock, U.S. Pat. No. 4,199,185, and Taylor et al., U.S. Pat. No. 4,156,543.

The advantages of attempting to reduce turbulence and/or drag by structures altering the flow of air along the sides of the vehicles has also been recognized. Saunders, cited above, provides vertical structures, behind a tractor unit, which extend beyond the sides of the unit. Their main purpose is to reduce body sway of a towed trailer due to the entry of a side wind between the tractor and the trailer. Where Saunders provides structure at the sides of, as opposed to behind, the tractor, such structure is provided by forming the sides of the tractor with recesses to direct air, first, inward, and, then, outward away from the gap between the tractor and the trailer. Stamm, also cited above, provides, in effect, conduits, each having an inside plate and an outside plate, near the rear of the tractor, to direct air streams to similar conduits near the front of the trailer. The inside plate of the conduit structure is joined to the tractor along one of its two large surfaces. The outside plate is attached to the inside plate with substantial space between the two plates. Such space is required to accomplish the conduit-type structure and the air stream effect.

Gulich et al., U.S. Pat. No. 3,878,914, provides vertical structures at the rear corners of a tractor, each providing three vertical concave surfaces. The primary purpose of the structures is to prevent engine exhaust from going forward to the passenger compartment, although there also is some air flow control.

Taylor et al., cited above, provides side curtains across the space between a tractor and a trailer; and Woolcock, also cited above, in the context of controlling the flow of air over the top of a tractor-trailer, also recognizes the desirability of directing air flow around a trailer which is wider than its tractor (FIG. 5).

Harris, U.S. Pat. No. 2,396,506, is less relevant than the above patents.

The present invention, as with the art in general, recognizes the substantial advantages to be garnered by reducing turbulence and drag associated with a towed vehicle by altering air flow at the sides of the towing and towed vehicles. However, it also recognizes and takes account of a number of other important concerns. First, it recognizes the advantages of simplicity of design and of construction of the structure which is to affect such air flow. Secondly, it recognizes that the capability for easy mounting and de-mounting of the structure is a significant concern, including minimizing any alterations of a vehicle on which the structure is mounted. Thirdly, it recognizes the need for structure particularly adapted to configurations other than the conventional tractor-trailer arrangement.

SUMMARY OF THE INVENTION

In accordance with the invention, an air deflector to mount on a first vehicle for towing a second vehicle includes: a side shield to extend outwardly and rearwardly outside a side wall of the first vehicle along such side wall; and a mounting for the shield, to mount the shield on the first vehicle. The shield has a front surface for deflecting air away from the vehicles, a rear surface, a first, outer edge surface to face away from such side wall of the first vehicle between the front and rear shield surfaces, and a second, inner edge surface to face toward such side wall of the first vehicle between the front and rear shield surfaces. The inner edge surface of the shield defines an edge surface contour for providing such facing of the first vehicle side wall by the inner edge surface, in close proximity to the side wall. The mounting, in accordance with this, provides for the mounting of the side shield on the first vehicle with the inner edge surface of the shield facing the side wall in such close proximity.

In accordance with more detailed features, the mounting is adapted for use on a first vehicle which is provided with structure defining a substantially vertical opening, and is also adapted for ready mounting, demounting and use. In particular, the mounting includes a post for inserting in the opening, to mount the shield on the first vehicle; the post has a surface to extend outwardly and rearwardly and to abut the front or rear shield surface, for outwardly and rearwardly guiding the shield; and the mounting further includes a mounting brace having a first flange to extend outwardly and rearwardly and to abut the front or rear shield surface for guiding the shield, and having a second flange to extend along and to abut the described side wall of the vehicle.

In accordance with other more detailed features of the initially described air deflector, the side shield is substantially flat; also, the mounting for the shield provides for the mounting of the shield on the first vehicle with the inner edge surface of the shield in close proximity to, but also in spaced-apart relation with, the described side wall of the first vehicle.

Method aspects of the invention are in accordance with the described air deflector and its use, including use on a first vehicle taking the form of a pick-up truck.

BRIEF DESCRIPTION OF THE DRAWINGS

FIG. 1 is a side, elevational view of a pick-up truck towing a fifth-wheel trailer, with the pick-up truck provided with a pair of air deflectors in accordance with the invention.

FIG. 2 is a plan view of what is shown in FIG. 1, partially broken away.

FIG. 3 is an elevational view directly facing the front surface of the right side air deflector of FIG. 1, removed from the pick-up truck.

FIG. 4 is a cross-sectional view, partially broken away, taken along the line 4—4 of FIG. 1.

FIG. 5 is a cross-sectional view taken along the line 5—5 of FIG. 1.

FIG. 6 is a cross-sectional view, partially broken away, taken along the line 6—6 of FIG. 1.

DETAILED DESCRIPTION

Referring, by way of introduction, initially to FIG. 2, a pick-up truck 12 is shown towing a conventional, fifth-wheel type trailer 14. The bed portion 16 of the pick-up truck has a right side air deflector 20 and a left side air deflector 22 mounted thereon. The deflectors are the same, apart from the fact that one is designed for the right side of the truck and the other is designed for the left side of the truck. Therefore, the structure of the right side air deflector 20, as shown in detail in FIGS. 1 and 3–6, also reveals the structure of the corresponding left side air deflector 22.

Thus, still by way of introduction, and focusing on the right side air deflector 20, it includes a shield 24, to accomplish the air deflection, and a post 26 and brace 28 which are particularly adapted to provide convenient mounting and de-mounting of the air deflector on the truck 12 while, at the same time, maintaining the shield 24 sturdily guided in the proper direction while on the vehicle. The shield has an outer 30, a lower, inner 32, an upper, inner 34, a top 36, a lower, bottom 40, and an upper, bottom 42, edge surface.

The lower, inner edge surface 32, when the deflector is mounted on the truck, faces toward the side wall 44 of the truck along which the deflector is mounted, in close proximity to the side wall along the full length of the portion of the side wall that it faces. The close proximity is to maintain at a relatively small level any effects of the air which passes between such inner edge surface and the side wall as the truck moves. However, while the lower, inner edge surface is in such close proximity, it also is in spaced-apart relation with the portion of such side wall which it faces. This spaced-apart relation is to eliminate damage which might otherwise occur due to contact between the edge surface and the side wall. A truck, such as the truck 12, may typically be used alone or in some other context in which air deflectors would not be employed; and it is advantageous to not only provide ease of mounting and de-mounting for the deflector, but to avoid deflector-vehicle contact which might damage the vehicle.

Now addressing the air deflectors and their construction and use in more detail, the pick-up truck 12 is of a conventional type. The side walls of the bed portion 16, one of which is the right side wall 44, have upper extensions, at their tops, which are folded over to provide narrow, upward facing ledges 46 at the tops of such side walls (FIG. 2). Three pairs of rectangular-shaped openings are cut in these ledges. Thus, there is a pair of rear 48, a pair of middle 50, and a pair of front 52, such openings. (The rear and middle openings are shown in phantom, as they are hidden by the trailer 14; and only part of the outline of the front openings can be seen due to their use in mounting the air deflectors 20 and 22.)

Each of these openings has the same form and construction. Further, rectangular-shaped tubes, all having the same form and construction, are attached under the ledges 46, one such tube per opening. Focusing on the right, front such tube 54 (FIG. 4), it, like all of the tubes, has an inner surface 56 which defines an area having essentially the same shape and size as its ledge opening. Further, like all of the tubes, it extends downward from its ledge opening a number of inches. The openings and their associated tubes are typically used for poles which can be employed, essentially as extensions of the side walls of the bed portion of the truck, to hold in a load or for other reasons.

Still referring to the truck 12, the bed portion of the truck is provided with a fifth-wheel type attachment mechanism 60 which is a conventional adaptation of the typical disk-like fifth-wheel mechanism on tractors which pull the large semi-trailers. In this case, the fifth-wheel mechanism includes a plate which rotates about a horizontal axis across the bed of the truck, and a jaw mechanism under the plate with an opening for the insertion of a pin from a trailer. The trailer 14 is provided with a column 62 to rest on the plate; and a pin (not shown) extends below the column for insertion in the jaws. This is a conventional, oft-utilized arrangement.

As can be seen from FIG. 2, the fifth-wheel type trailer 14 has a width which is somewhat greater than the width of the truck 12. Thus, its side walls are beyond the side walls of the truck a number of inches on each side. In addition, the fifth-wheel type trailer 14, as is shown, includes an overhang portion 64 which hangs over the bed of the truck 16. It is well known that substantial turbulence and drag is caused by such factors as the greater relative width of the trailer, as compared to the truck, the overhanging of the truck by the trailer, the space between the overhang portion and the truck structure, and the space between the lower front wall 66 of the trailer and the rear of the bed portion of the truck. Although the turbulence and/or drag attributable to the overhang portion and to the space between such portion and vehicle structure, is somewhat peculiar to the particular pick-up truck-fifth-wheel type trailer arrangement, the other areas of concern are more generally applicable to a variety of situations where one vehicle is towing another vehicle.

Now focusing on the situation at the right side of the truck 12 and trailer 14, and on the right air deflector 20, as also fully revealing the comparable situation at the left side of the truck and trailer, and as fully revealing the comparable left air deflector 22, the post 26 of the deflector 20 has an upper portion 68 and a lower portion 70 (FIG. 3). The upper portion, which starts at the point along the post where the shield 24 is attached along the post, continues upward from that point to the top of the post. The upper portion has a trapezoidal-shaped cross-section (FIG. 5)—i.e., four-sided with two parallel sides, a third side perpendicular to the two parallel sides and a fourth side which is not perpendicular to the two parallel sides. Thus, with reference to its position in FIG. 1, the upper portion of the post has square off rear 72, inside 74 and outside 76, generally vertically extending surfaces, and an angled generally vertically extending front surface 80.

In position on the truck, the front surface 80 extends rearwardly and outwardly and abuts the rear surface 82 of the shield 24. Thus, the front surface of the upper portion of the post serves as a stable mounting surface for the shield and, in position on the truck, rearwardly and outwardly guides the shield. The shield and the upper portion of the post have three openings therethrough for nut and bolt arrangements 84 which hold the shield and post together.

The lower portion 70 of the post has a rectangular-shaped cross-section which permits the lower portion of the post to mate with the right front one of the two front openings 52 in the ledges 46 along the bed portion 16 of the truck. It also allows the lower portion of the post to mate with the right front rectangular-shaped tube 54. Two openings 86 are provided through the lower portion of the post. These are for the passage of bolts, which also pass through opposed side walls of the tube, and which with associated nuts, aid in holding the air deflector in position when it is mounted. It is somewhat noteworthy that, as with all the rectangular-shaped tubes, the right front rectangular-shaped tube has a bottom and, therefore, is in the nature of a pocket. Thus, the bottom of the post rests against the bottom of the tube. Thus, the nut and bolt arrangements are not necessary to mantain the post from slipping downward through the tube, but to keep the post from flying out of the tube when the truck 12 is moving.

In the particular embodiment shown, the shield 24, which of course is flat, when in position on the truck 12, extends outwardly and rearwardly at about a 45 degree angle with respect to the front-to-rear direction of the truck. This angle is represented by the dashed arc 87 of FIG. 5. This angle, of course, can be varied somewhat; however, a 45 degree angle has yielded good results. Further, in the particular embodiment, the air deflector is designed so that its shield 24 extends outward to a width which is about one inch outside the line of the side wall of the trailer 14. This clearance is represented by the arrows 88 in FIG. 2. This has also been found to yield good results; however, it, including whether or not the shield in fact extends beyond this line, can be varied.

The lower, inner edge surface 32 of the shield 24 is cut to a contour which closely follows the contour of the portion of the side wall 44 of the truck which it faces along the full length of such portion. As previously indicated, this contour, as well as the mounting for the shield 24, provides close proximity between the facing portion of the lower, inner edge surface 32 (note that the top portion of the surface extends above the side wall) and the side wall 44 while maintaining such surface and side wall in spaced apart-relation with one another. In the particular embodiment shown, in position on the truck 12, a distance of about one-eighth to one-quarter inch exists to accomplish the close proximity and spaced-apart relation. (Such close proximity, but spaced-apart relation, is exemplified in, e.g., FIG. 4.) It, however, is noteworthy that an air deflector similar to that shown, from the point of view of maximum reduction of turbulence and/or drag might well be designed with an inner edge surface which is maintained not only in close proximity to, but in abutment with, the portion of the side wall which it faces. However, this might be at some sacrifice with respect to undesirable alteration or damage of the vehicle due to such abutment.

The brace 28 of the air deflector mounting is designed consistently with the desire to provide for stability of the shield, to maintain the indicated relationship between the lower, inner edge surface 32 of the shield and the side wall of the truck, and to minimize the need for alterations to the truck as a result of the air deflector.

Thus, referring to FIGS. 1, 3 and 6, the mounting brace 28 has a shield flange 90 which, with the air deflector in position, has a front surface 91 which extends rearwardly and outwardly, and abuts the rear surface 82 of the shield 24 in guiding the rearward and outward extension of the shield. Nut and bolt arrangements 92 are used to attach the shield 24 to the shield flange 90.

The brace 28 also has a truck flange 94. In this connection, the truck 12, in conventional fashion, incorporates a thin lower extension 96 of its side wall 44 along a portion of such side wall, including the portion where the side shield is mounted. This extension, considered to be a part of the side wall, is employed to attach the truck flange of the brace to the side wall. This is shown in FIG. 6 wherein the truck flange 94 extends along and abuts this lower extension of the side wall. As is also shown, the attachment is through nut and bolt arrangements 100.

With the air deflector 20 in position, the front surface 102 of the shield 24, of course, deflects air as the truck 12 and trailer 14 travel through the air, creating a wind realtive to them. In position, a portion of the shield 24, between the outer edge surface 30 and the upper, inner edge surface 34, extends over and above the side wall 44 along which the shield extends. It is noteworthy that such extending over and above the side wall is of substantial interest in providing the sort of air deflector, including the air deflector mounting technique, which is desired.

Right and left side air deflectors 20 and 22, as shown and described, have been found to substantially reduce turbulence and air drag. Just by way of visual example, without the air deflectors there is typically great turbulence under the overhang portion 64 of the trailer, between such portion and structure of the pick-up truck 12. Typically, relatively light materials in the bed of the truck will be pulled off the floor of the bed and moved around by such turbulence. With the air deflectors, this effect is substantially decreased or eliminated.

Further, air deflectors as described and shown, with a shield 24 and a post 26 made of an aluminum material, were provided on a 1980 Chevrolet pick-up truck, of the general type shown in FIG. 1, which was used to pull an approximately 28-foot-fifth-wheel trailer, also of the general type shown in FIG. 1. The pick-up truck, along with the side air deflectors, was also provided with a conventional top air deflector, to also reduce turbulence and drag. The pick-up truck was about 6 feet 6 inches wide and the trailer was about 8 feet wide. The lower front of the trailer was about 18 inches from the rear of the truck; and the air deflectors were mounted so that the outer edges of their shields were at a position about 9 feet 4 inches forward of the position of the lower front of the trailer and about 2 feet 6 inches forward of the position of the upper front of the trailer. An approximately 2,000 mile trip was taken from the Los Angeles area of California to Yellowstone National Park in Idaho and back. With the top deflector in position, the side air deflectors were used for 200 miles, removed for 200 miles, used for 200 miles again, etc., during the trip. The average mileage with the top deflector alone ranged from about 7 to 7½ miles per gallon. However, the average mileage with both the top deflector and the side deflectors was in the range of 10½ to 11 miles per gallon. This is a substantial improvement due to the side air deflectors. By way of further comparison, the pick-up truck, when not pulling a trailer, typically travels in the range of about 15 miles per gallon; and, when towing the trailer without a top deflector or side deflectors, it typically travels in the range of about 6½ to 7 miles per gallon. This, latter information shows that the advantages attributable to the side deflectors may well be greater than those typically derived from a top deflector, at least for the particular pick-up truck, fifth-wheel trailer type arrangement of FIG. 1.

Although an aluminum material has been found to be advantageous for forming the shields and posts of the air deflectors shown and described herein, a variety of other materials, ranging from wood to plastics could also be used.

It will be apparent to those skilled in the art that many changes and modifications may be made in the described embodiments without departing from the spirit or scope of the invention.

What is claimed is:

1. An air deflector to mount on a first vehicle for towing a second vehicle, said first vehicle being provided with structure defining a substantially vertical opening, comprising:
   side shield structure to extend outwardly and rearwardly outside a side wall of the first vehicle along said side wall, said side shield structure having a front surface for deflecting air away from the vehicles and a rear surface; and
   a mounting for said shield structure to mount said shield structure on the first vehicle, said mounting including a post having a portion for securing said shield structure on said post and a portion for inserting in the substantially vertical opening to mount said shield structure on the first vehicle.

2. An air deflector as defined in claim 1 wherein said mounting further comprises a mounting brace, said brace having a first flange to extend outwardly and rearwardly and to abut a said front or rear surface of said shield structure, and a second flange to extend along and to abut said side wall of the first vehicle.

3. An air deflector as defined in claim 1 wherein said side shield structure is substantially flat.

4. An air deflector as defined in claim 1 wherein said mounting further comprises a flange to extend along said side wall of the first vehicle.

5. A method for providing an air deflector on a first vehicle for towing a second vehicle, comprising the steps of:
   providing shield structure having a front surface and a rear surface;
   mounting said shield structure on the first vehicle to extend outwardly and rearwardly outside a side wall of the vehicle along said side wall with said front surface facing for deflecting air away from the vehicles, said mounting step including inserting a portion of a post for said mounting in an opening defined by structure provided on said first vehicle, said post having a portion for securing said shield structure on said post.

6. A method of providing an air deflector as defined in claim 5 on a first vehicle which is a pick-up truck, wherein said side wall of said mounting step is the side wall of the bed portion of the pick-up truck.

7. A method of providing an air deflector as defined in claim 6 wherein said mounting step further includes attaching said shield structure to said post.

8. A method for providing an air deflector as defined in claim 5 wherein said mounting step includes mounting said shield structure on the first vehicle to extend vertically beyond said side wall of the first vehicle.

9. A method of providing an air deflector as defined in claim 5 wherein said shield structure is substantially flat.

10. A method of providing an air deflector as defined in claim 5 wherein said opening defined by structure provided on said first vehicle, is a substantially vertical opening.

11. A method of providing an air deflector as defined in claim 10 wherein said mounting step further includes attaching said shield structure to said post.

12. An air deflector as defined in claim 4 wherein said mounting further comprises a second flange to extend outwardly and rearwardly substantially parallel to said shield structure.

* * * * *